United States Patent
Sander et al.

(10) Patent No.: US 7,663,638 B2
(45) Date of Patent: Feb. 16, 2010

(54) STROKED FILL

(75) Inventors: Nikolai Sander, Fairfax, CA (US); Mason J. Foster, Walnut Creek, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 11/286,535

(22) Filed: Nov. 23, 2005

(65) Prior Publication Data
US 2007/0115287 A1    May 24, 2007

(51) Int. Cl.
*G06T 11/20* (2006.01)
*G09G 5/00* (2006.01)

(52) U.S. Cl. .................. 345/582; 345/442; 345/441
(58) Field of Classification Search ........... 345/582, 345/619, 440, 441, 442
See application file for complete search history.

(56) References Cited

U.S. PATENT DOCUMENTS

| | | | |
|---|---|---|---|
| 4,941,193 A | 7/1990 | Barnsley et al. | |
| 4,970,666 A | 11/1990 | Welsh et al. | |
| 5,619,633 A * | 4/1997 | Turner | 345/441 |
| 5,739,825 A * | 4/1998 | Turner | 345/441 |
| 5,847,712 A * | 12/1998 | Salesin et al. | 345/582 |
| 5,982,383 A | 11/1999 | Kumar et al. | |
| 6,007,338 A | 12/1999 | DiNunzio et al. | |
| 6,031,541 A | 2/2000 | Lipscomb et al. | |
| 6,128,019 A | 10/2000 | Crocker et al. | |
| 6,202,073 B1 | 3/2001 | Takahashi | |
| 6,226,015 B1 * | 5/2001 | Danneels et al. | 345/473 |
| 6,256,039 B1 | 7/2001 | Krishnamurthy | |
| 6,268,865 B1 * | 7/2001 | Daniels et al. | 345/582 |
| 6,330,005 B1 | 12/2001 | Tonelli | |
| 6,373,499 B1 | 4/2002 | Acker | |
| 6,426,748 B1 | 7/2002 | Megahed | |
| 6,556,196 B1 | 4/2003 | Blanz et al. | |
| 6,628,279 B1 | 9/2003 | Schell et al. | |
| 6,813,042 B2 | 11/2004 | Hawksworth et al. | |
| 6,870,550 B1 * | 3/2005 | Schuster et al. | 345/639 |
| 6,912,293 B1 | 6/2005 | Korobkin | |
| 6,917,369 B2 | 7/2005 | Perry et al. | |
| 7,038,694 B1 | 5/2006 | Santodomingo et al. | |
| 7,050,067 B2 | 5/2006 | Raubacher et al. | |
| 7,061,501 B1 * | 6/2006 | Lake et al. | 345/582 |

(Continued)

FOREIGN PATENT DOCUMENTS

EP    1189176    3/2002

OTHER PUBLICATIONS

Salisbury et al., Orientable Textures for Image-Based Pen-and-Ink Illustration, 1997, ACM International Conference on Computer Graphics and Interactive Techniques, pp. 1-6.*

(Continued)

*Primary Examiner*—Kee M Tung
*Assistant Examiner*—Michelle K Lay
(74) *Attorney, Agent, or Firm*—Gates & Cooper LLP

(57) ABSTRACT

A method, apparatus, and article of manufacture provide the ability to display a stroked fill for an object. A computer-generated rendering is obtained that consists of vector geometry. Closed geometry is obtained in the computer-generated rendering. Lastly, a fill is automatically created. The fill consists of a series of two or more curves, wherein each curve in the series crosses an interior of the closed geometry.

33 Claims, 4 Drawing Sheets

U.S. PATENT DOCUMENTS

| | | | |
|---|---|---|---|
| 7,190,376 | B1 | 3/2007 | Tonisson |
| 7,360,175 | B2 | 4/2008 | Gardener et al. |
| 2002/0059337 | A1 | 5/2002 | Takaoka et al. |
| 2002/0102989 | A1 | 8/2002 | Calvert et al. |
| 2003/0011599 | A1 | 1/2003 | Du |
| 2003/0058241 | A1 | 3/2003 | Hsu |
| 2004/0263512 | A1 | 12/2004 | Santodomingo et al. |
| 2005/0108215 | A1 | 5/2005 | Thomas et al. |
| 2005/0122334 | A1 | 6/2005 | Boyd et al. |
| 2005/0166138 | A1 | 7/2005 | Kundu |
| 2005/0190181 | A1 | 9/2005 | Sakagawa et al. |
| 2005/0225552 | A1 | 10/2005 | Anand |
| 2006/0114262 | A1 | 6/2006 | Yamauchi et al. |

OTHER PUBLICATIONS

Fabris et al., An Efficient Filling Algorithm for Non-simple Closed Curves using the Point Containment Paradigm, 1997 IEEE, pp. 2-9.*

Salisbury, M. et al., "Interactive Pen-and-Ink Illustration", p. 1-8, Mar. 1995.*

Dayton et al., "The Photoshop 5/5.5 Wow! Book", 2000, Peachpit Press, pp. 220-237, 242-247.*

Weinmann et al., "Photoshop 7 for Windows and Macintosh", 2003, Peachpit Press, chpt 12.*

"The Prologue Battle," http://web.archive.org/web/*/http://lsdis.cs.uga.edu/~cthomas/courses/anim/slides/lotr_prologue_battle.html, Jun. 10, 2004.

"Flash Symbols," Smartwebby.com, http://web.archive.org/web/20050428080422/http://www.smartwebby.com/Flash/flash_symbols.asp (http://web.archive.org/web/*/http://www.smartwebby.com/Flash/flash_symbols.asp), Apr. 28, 2005.

Curtis et al., "Computer-generated watercolor," International Conference on Computer Graphics and Interactive Techniques, Proceedings of the 24th Annual Conference on Computer Graphics and Interactive Techniques, pp. 421-430 (1997).

Adobe Creative Team, "Adobe Photoshop 6.0 Classroom in a Book," Adobe Press, chapter 3, Dec. 28, 2000.

Shadow Caster User's Guide, "Sophisticated Drop Shadows and Effects for QuarkXPress," 37 pages, 2005.

SketchUp for Microsoft Windows User Guide, www.sketchup.com, pp. 38-40, 71, 251, 252, 324 and 364, 2005.

Reeves et al., "Rendering Antialiased Shadows with Depth Maps," Computer Graphics, 21(4):283-291, Jul. 1987.

* cited by examiner

STROKED FILL

CROSS-REFERENCE TO RELATED APPLICATIONS

This application is related to the following co-pending and commonly-assigned patent application, which application is incorporated by reference herein:

U.S. patent application Ser. No. 11/268,797, entitled "AUTOMATIC ELEMENT SUBSTITUTION IN VECTOR-BASED ILLUSTRATIONS", by Mason J. Foster, filed on Nov. 8, 2005;

U.S. patent application Ser. No. 11/268,796, entitled "DRAWING STYLE DOMAINS", by Mason J. Foster, Jose Madeira de Freitas Garcia, and Joseph Cleveland Ard, filed on Nov. 8, 2005; and U.S. patent application Ser. No. 11/286,658, entitled "CASTING SHADOWS", by Mason J. Foster, filed on the same date herewith.

BACKGROUND OF THE INVENTION

1. Field of the Invention

The present invention relates generally to architectural renderings, and in particular, to a method, apparatus, and article of manufacture for filling a shape to achieve a natural hand-drawn effect in an architectural rendering.

2. Description of the Related Art

In the architectural, engineering, and construction (AEC) fields, computer aided design (CAD) drawings are often used to design blueprints, drawings, plans, etc. However, such CAD drawings may be complex, confusing, and fail to provide an end-user (e.g., a potential client) with a drawing or visualization of the "intent" of the architect or designer. Architectural renderings are designed to illustrate the "intent" of the designer or architect, as opposed to showing precise fidelity. In these renderings, the illustrator may want the inside of an object (referred to as fill) to appear natural. In the prior art, such object fill usually consists of a solid/transparent color, an image, or a pattern. In this regard the prior art techniques fail to achieve a hand-drawn look of natural art tools. Such problems may be better understood with a description of prior art drawing software and methodologies.

CAD programs provide high fidelity drawings that fail to provide a visualization of the intent of the user. Such CAD programs or other drawing programs may be vector-based or raster-based. It may be possible to achieve hand-drawn effects in raster-based drawing programs. For example, in a raster-based program, a bitmap stroke may be created that appears hand-drawn (e.g., using a variety of raster-based drawing/paint tools). However, it may be preferable to work in a vector-based drawing. For example, in vector-based drawing programs, a user may work with modifiable shapes that can be edited, resized, and rearranged. Nonetheless, the inherent mathematical description of vector shapes lends itself to the production of hard-edged, non-organic artwork. Thus, it has always been a challenge for digital artists to achieve natural hand-drawn effects in a vector-based drawing program.

There are a number of domains, architecture being one, where there is a need to be able to create natural-looking renderings of (inherently) geometric hard-edged drawings. In this regard, architectural renderings may take a variety of forms or styles, from hand-drawn renderings, to cartoon-like rendering, to ultra-realistic 3D rendering. In an architectural rendering, it's less important to be geometrically accurate, and more important for the drawing to be able to evoke the "spirit/goals" of the project.

While the prior art has attempted to create vector-based strokes that appear organic, the prior art has failed to make object fills appear natural. For example, prior art programs may attempt to fill an object utilizing a single Bezier curve that wraps back and forth from one side of a shape to the next. Such a technique utilizes a single stroke and does not appear authentic or hand-drawn. Instead, the single Bezier curve appears computer generated. Another prior art technique may define a shape using a Bezier curve and utilize the defined shape as the paint stroke. For example, if a rectangle is defined, as the user draws the stroke and presses harder (e.g., using a stylus and tablet device), the rectangle deforms in relation to the pressure. However, the shape or stroke or pressure cannot be modified after it is drawn.

In view of the above, fills, in general, are typically either solid/transparent color, images or patterns. Such prior art fill techniques fail to achieve an easy, intuitive, vector-based modifiable means for providing a hand-drawn look of natural art tools.

Accordingly, what is needed is a way to create a modifiable vector fill in a object-based drawing program that simulates natural-media techniques.

SUMMARY OF THE INVENTION

Embodiments of the invention provide the ability to fill an object or shape with various strokes that appear hand-drawn. Initially, an arbitrary area is identified by the user. Such an arbitrary area may be identified by creating/obtaining a closed shape or curve. For example, the user may opt to create a closed shape/object such as a circle, square, or Bezier curve.

The user elects to fill the curve/closed shape/object with a particular fill (e.g., pencil, fat marker, crayon, etc.) and/or fill style (e.g., stroked). Curves are then created to be used as the fill in accordance with one or more parameters specified by the user. The curves may be any type of curves such as multi-segmented Bezier curves. Such curves are clipped where they penetrate the border of the closed curve. Variations that provide for the regularity or irregularity of the curves may then be applied to the curves. Such regularities/irregularities may be specified by the user based on a numeric value. Once the variations are applied, the resulting fill is displayed/rendered to provide a hand-drawn like effect/appearance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method, apparatus, system, technique, etc. that achieves the look of a hand-drawn fill. The invention simulates the look of multiple strokes of an art marker (e.g., crayon, pencil, magic marker, etc.) over/across the area of an object.

Hardware and Software Environment

Figure 1:
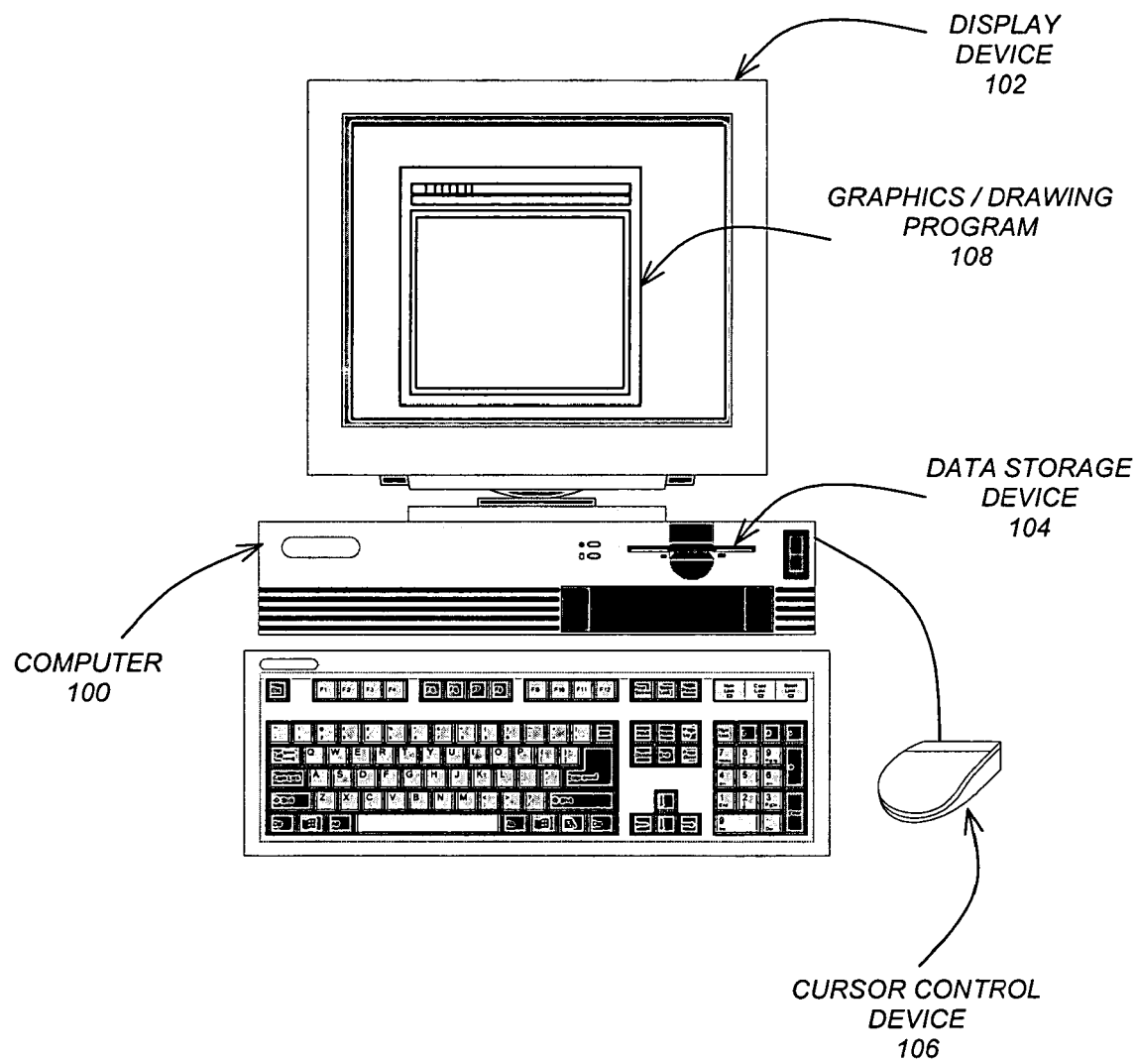
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device or media e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Rendering Software

In one or more embodiments of the invention, graphics program 108 is an vector-based drawing application (e.g., an architectural renderer) that provides a rendering (e.g., hand-drawn, cartoon-like, ultra-realistic 3D content) of a drawing. Another graphics program 108 may consist of a more precise fidelity application such as a CAD application.

Figure 2:
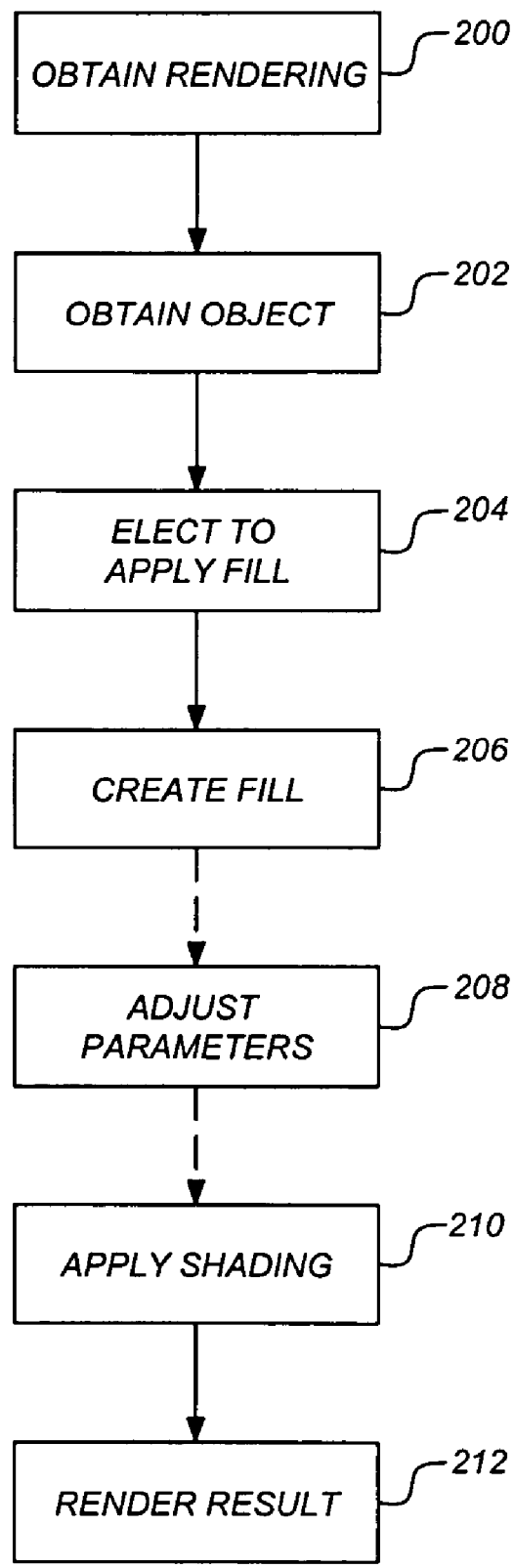
FIG. 2 illustrates the logical flow for filling an object/geometry in accordance with one or more embodiments of the invention.

FIG. 2 illustrates the logical flow for filling an object/geometry in accordance with one or more embodiments of the invention. Once a vector-based drawing application 108 has been started, a computer-generated rendering consisting of vector geometry is obtained at step 200. The user may then obtain (e.g., select or create) a closed object/geometry in the drawing at step 202. Such a closed object may be graphically represented on the display 102 as a shape, a curve, or a stroke. In addition, to fill the object, the object must be closed or contained in an area that can be closed/enclosed so that a boundary for the fill can be established. In this regard, a closed object/shape is referred to herein as any object or shape for which a boundary or outline can/may be established that encloses an area for the object. Such an enclosed area may be part of the shape/object, the entire area of the shape/object, or an area larger than the shape/object. In addition, the enclosed shape's boundary may be defined by the perimeter of a shape itself or by a property of the shape/object that specifically defines an enclosed area. Further, embodiments of the invention may create the enclosed object based on a stroke of a user. For example, a user may draw a Bezier curve that the program 108 could automatically create/modify into an enclosed shape.

After obtaining the enclosed object, the user may elect to apply a fill at step 204. Such an election may be automated without any further action by the user. For example, when the object is obtained, a default operation may provide for applying an identified/specified fill. Alternatively, a menu or property of the object may be displayed in which the user indicates an election to fill or not to fill the object.

At step 206, the fill for the enclosed object may be created/obtained. In this regard, a series of two or more curves (e.g., Bezier curves) that cross the interior of the object/closed geometry may be created. Alternatively, a default set of fill curves may be stored in a database based on an object/type of object and merely retrieved at step 206.

Any type of curve may be used. In addition, an arbitrary area such as a bounding box that encompasses the object/geometry may be used to create the parameter space that the curves are created in. Such a bounding box is first filled with the various curves, that are later clipped against the actual closed shape. Such a bounding box and the actual fill-curves may be adjusted such that the fill-curves appear irregular (e.g., using a wiggle effect, noise effect, jitter effect, etc.). In addition, the user may opt not to display the boundary and only show the fill.

The curves within the enclosing shape may consist of a series of segmented curves. Thus, rather than having a single Bezier curve that consumes the entire fill area, multiple curves are utilized by the invention. The use of multiple curves provides a more realistic and natural looking effect. In this regard, the user may have the option of varying the length of a curve or establishing a maximum curve length. Such a property may cause longer curves to be broken up into smaller ones to thereby provide a more hand-drawn like appearance. For example, if the curve exceeds a certain length, the curve is split into two or more strokes, thereby simulating what a user would do. Accordingly, rather than a single long curve, the invention may utilize several short strokes to be used as the fill.

Once the fill curves are created at step 206, the user may have the option of adjusting the parameters of the curve at step 208. Such parameters may include the number of curves (e.g., to vary the number of strokes/curves utilized in the fill), the angle of the curves, the spacing, the randomness of their trajectories, the radius of the curves, thickness, and overlap (among other parameters). It should also be noted that the parameters/properties of the curve may be adjusted subsequent to rendering the fill/series of curves. Further, the display may be automatically and dynamically updated to reflect the adjusted parameters.

Figure 3:
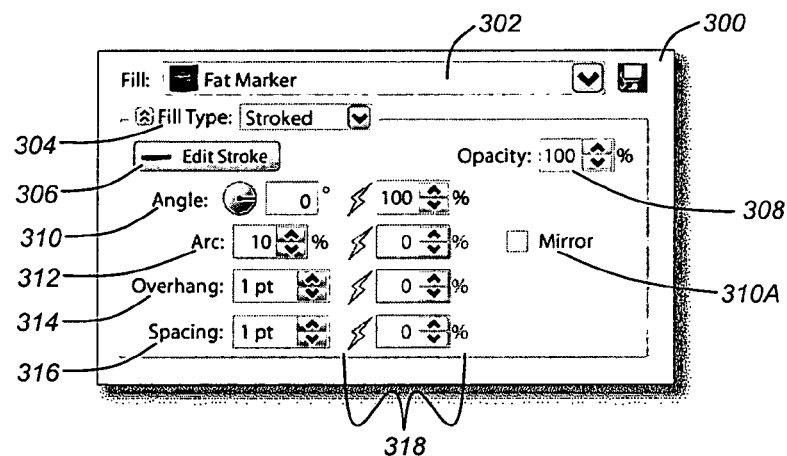
FIG. 3 illustrates an example of a dialog window displaying exemplary properties for a stroked fill in accordance with one or more embodiments of the invention.

FIG. 3 illustrates an example of a dialog window 300 displaying exemplary properties for a stroked fill in accordance with one or more embodiments of the invention. The fill drop down field 302 allows the user to select the particular art material used to draw the fill. As indicated in FIG. 3, a fat marker has been selected in field 302. Different art material may include watercolor, pencil, chalk, pastel, oil paint, etc. Field 304 allows the user to select the type of fill to be used. In FIG. 3, the fill type is indicated as a stroked fill. Other choices for the fill type 304 may include a pattern or an image.

The edit stroke button 306 allows the user to select the stroke to be used as a fill from among different stroke styles. A tree with the various styles and the properties for each style may be displayed when the edit stroke button 306 is activated. Once a particular style/stroke has been selected, a preview of the stroke may be displayed in the button 306.

The opacity field 308 allows the user to set the opacity of the selected style/stroke. The opacity level may be specified in terms of percentages 0-100. The angle field 310 allows the user to specify the angle at which the fill is oriented. Numeric values specified in the angle field 310 may be converted to degrees. Alternatively, a circle spinner may be used to specify an angle from −360 to 360 degrees.

The second column 318 adjacent to each property 310-316 is a variation property that allows the user to set the variation for each property for each line in the stroke fill. For example, the variation property 318 for the angle 306 sets the variation of the angle for each line in the stroke. In this regard, by varying each stroke in the fill on a per property basis, the stroke will appear more natural/hand-drawn. The variation property 318 will work through the utilization of a randomizer in accordance with the user specified value (or a default value) that determines how regular/irregular the variation occurs. Accordingly, the randomizer will vary the property from stroke to stroke based on the amount/degree of randomness specified in the variation property 318.

Figure 4:
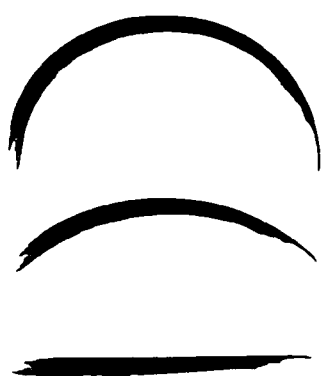
FIG. 4 illustrates examples of various arc values in accordance with one or more embodiments of the invention.
Figure 5A:
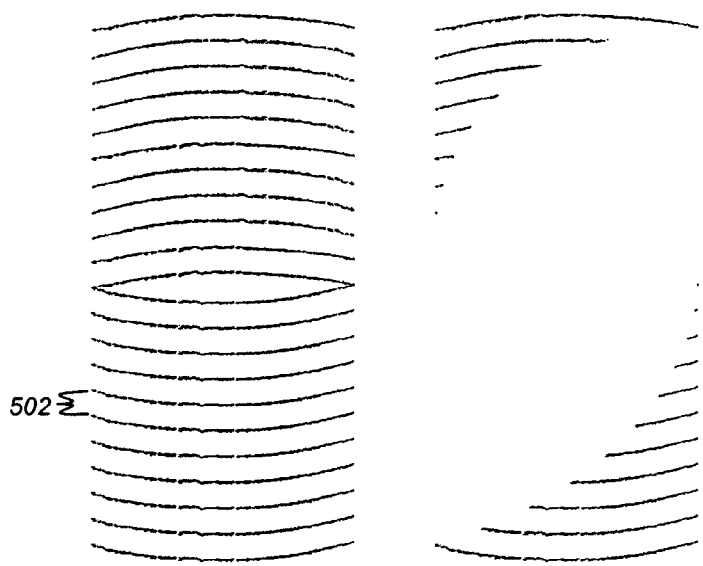
FIGS. 5A and 5B illustrate examples of objects using a mirror option in accordance with one or more embodiments of the invention.
Figure 5B:
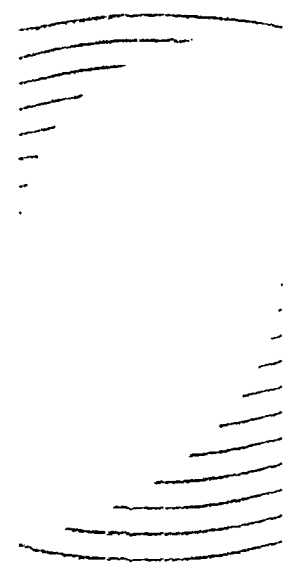

The arc property 312 sets the bend amount of the stroke from −100 to 100%. FIG. 4 illustrates examples of various arc values in accordance with one or more embodiments of the invention. The top arc value is 100% bend, the middle 50% bend, and the bottom 0% bend (i.e., no bend). The variation property 318 for the arc field 312 sets the variation of the arc for each line in the stroke. The mirror property 310A for the arc property 310 determines whether the arc value is flipped for lines below the mid-point of the geometry's bounding box. FIGS. 5A and 5B illustrate examples of objects using the mirror option. In FIG. 5A, the mirror option is active. In FIG. 5B, the mirror option is active in combination with the use of a cutout effect wherein a portion of the object is cutout. In FIG. 5B, the cutout portion is an oval.

The overhang property 314 sets the amount that the stroke overhangs the surrounding vector path (e.g., from −1000 to 1000 pt). In other words, the overhang property 314 determines how much the stroke fill will exceed (or fall below) the boundary of the shape that is being filled. The variation property 318 establishes the variation of the overhang for each line in the stroke.

The spacing property 316 sets the spacing between paths of the stroke fill (e.g., from 0.1 to 1000 pt). An example of the spacing is illustrated in FIG. 5A at 502. The variation property 318 for the spacing sets the variation of the spacing for each line in the stroke.

Referring again to FIG. 2, the various parameters (examples of which are described above) may be adjusted or defined at step 208. In view of the various parameters/properties, each of the curves may be more than a simple Bezier curve/spline. For example, the curve may be converted to a faceted 3D object. Once the curves have been created at 206 and the parameters optionally adjusted at step 208, the program 108 may optionally apply shading to the objects/curves to simulate a specific natural art material or non-natural art material at step 210. As described above, such simulated natural art materials may include a fat marker, chalk, oil paint, pencil, etc.

Figure 6A:
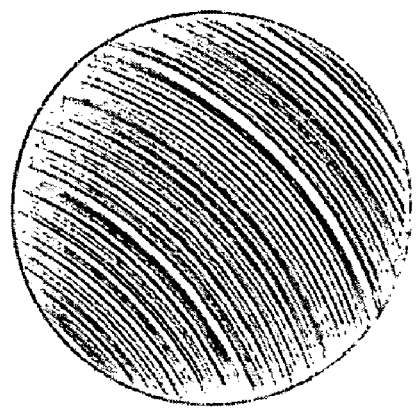
FIGS. 6A-6C illustrate a rendered result using the stroked fill in accordance with one or more embodiments of the invention.
Figure 6B:
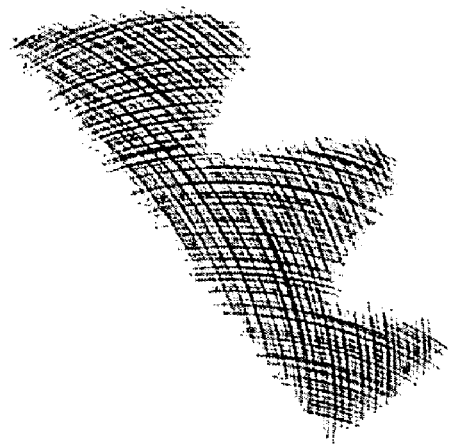
Figure 6C:
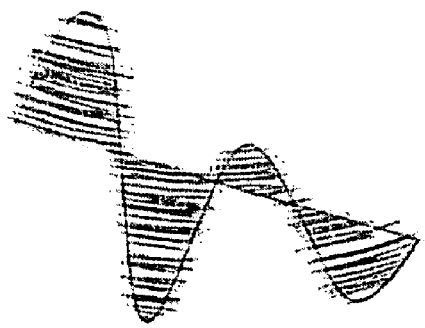

Once the shading has been completed, the result is rendered (e.g., using 3D techniques without a lighting component) at step 212. FIGS. 6A-6C illustrate a rendered result using the stroked fill in accordance with one or more embodiments of the invention. In FIG. 6A, a circle object contains stroked fill. It should be noted that numerous strokes/curves are contained in the illustrated fill with variations on the overage (indicated by the different lengths of the strokes) and the spacing. In addition, the user may elect to blend in/out at the end/edges of the strokes. In FIG. 6A, the edges of the strokes fade/blend out. While FIG. 6A illustrates the boundary being displayed, the user may also opt to not display the boundary wherein only the fill would display. Alternatively, the outer boundary could be adjusted to provide for wiggle, noise, jitter, or other property.

In FIG. 6B, a Bezier curve is the selected shape that contains the fill in the enclosed area that has been created. The fill is a series of strokes that travel in different directions to provide a hatching. Again, the overage varies on each stroke to provide a more natural appearance. Further, some strokes may vary based on a user-specified parameter for the darkness/thickness of the stroke.

In FIG. 6C, a Bezier curve is also used and the enclosed areas are automatically created by the invention under each arc. Similar to FIGS. 6A and 6B, the overages, spacing, and thickness/darkness of each stroke vary.

Further, once the fill/curves have been created as illustrated in FIGS. 6A-6C, the various parameters may still be adjusted thereby modifying the fill.

Hardware Acceleration

Embodiments of the invention may also take advantage of hardware (e.g., graphic processing units or 3D rendering hardware) within the computer 100, to expedite the shading and rendering process. In this regard, graphics hardware minimum may be specified in order to take advantage of such capabilities. Strokes that are created may be transformed into flat 3D objects/meshes and a hardware renderer may then be used to shade the mesh. Alternatively, a flat 2D geometry (e.g., a single flat plane) is created with the various strokes and shaded using the hardware renderer. In addition, the rendering may occur in three dimensions. For example, a thickness and/or reflective properties may be provided for the fill material such that the material appears to extrude from the rendered image or reflect light (e.g., an oil paint may have a depth and capabilities to reflect lighting). Alternatively, if a 3D model is used, the invention may collapse such a 3D model into 2D while storing some or all of the 3D information (e.g., storing information to respect the lighting).

Thus, the shading that is applied to the fill may be processed by a graphics hardware. However, the fill itself may be created without the use of such graphics hardware.

In addition to the creation of the fill or the shading using graphics hardware, the hardware may be used to dynamically view the rendered fill while parameters are being adjusted on the fly. In other words, while the user is adjusting one or more of the parameters as described above, the display will automatically and dynamically update to reflect the adjustments. For example, if the user elects to change the overhang property 314 or variation 318 of the overhang property 314, the hardware of the computer 100 may be used to dynamically display/render the updated fill as the changes to the parameters are made by the user. Such capabilities allow the user flexibility to view changes to various parameters in real time in an efficient and intuitive manner.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for displaying a stroked fill for an object, comprising:
   obtaining a computer-generated rendering comprised of vector geometry;
   obtaining a closed geometry in the computer-generated rendering;
   automatically creating, in a computer, a fill comprised of a series of two or more curves, wherein each curve in the series crosses an interior of the closed geometry;
   subsequent to creating the fill, adjusting a property for the series of curves;
   automatically adjusting each curve in the series of curves based on the adjusted property without user input; and
   displaying the fill on a display device.

2. The method of claim 1, wherein the property is adjusted by a user via a graphical user interface.

3. The method of claim 1, wherein the property has a related variation parameter that defines a percentage of variation for the property for each curve in the series.

4. The method of claim 1, wherein the property comprises an angle property that defines an angle at which the fill is oriented.

5. The method of claim 1, wherein the property comprises an arc property that defines a bend amount of each curve in the series.

6. The method of claim 1, wherein the property comprises an overhang property that defines an amount that each curve overhangs a boundary of the closed geometry.

7. The method of claim 1, wherein the property comprises a spacing property that defines a spacing between each curve in the series.

8. The method of claim 1, wherein:
   the property of the series of curves is adjusted subsequent to rendering the fill; and
   the rendered fill is automatically and dynamically updated to reflect the adjustment.

9. The method of claim 1, wherein each of the two or more curves comprises a Bezier curve.

10. The method of claim 1, further comprising applying a shading to the fill to simulate a specific natural art material.

11. The method of claim 1, further comprising rendering the fill.

12. An apparatus for displaying a stroked fill for an object in a computer system comprising:
   (a) a computer having a memory;
   (b) an application executing on the computer, wherein the application is configured to:
      (i) obtain a computer-generated rendering comprised of vector geometry;
      (ii) obtain a closed geometry in the computer-generated rendering;
      (iii) automatically create a fill comprised of a series of two or more curves, wherein each curve in the series crosses an interior of the closed geometry;
      (iv) subsequent to creating the fill, adjust a property for the series of curves; and
      (v) automatically adjust each curve in the series of curves based on the adjusted property without user input.

13. The method of claim 1, wherein the property is adjusted by a user via a graphical user interface.

14. The apparatus of claim 12, wherein the property has a related variation parameter that defines a percentage of variation for the property for each curve in the series.

15. The apparatus of claim 12, wherein the property comprises an angle property that defines an angle at which the fill is oriented.

16. The apparatus of claim 12, wherein the property comprises an arc property that defines a bend amount of each curve in the series.

17. The apparatus of claim 12, wherein the property comprises an overhang property that defines an amount that each curve overhangs a boundary of the closed geometry.

18. The apparatus of claim 12, wherein the property comprises a spacing property that defines a spacing between each curve in the series.

19. The apparatus of claim 12, wherein:
   the property of the series of curves is adjusted subsequent to rendering the fill; and
   the rendered fill is automatically and dynamically updated to reflect the adjustment.

20. The apparatus of claim 12, wherein each of the two or more curves comprises a Bezier curve.

21. The apparatus of claim 12, wherein the application is further configured to apply a shading to the fill to simulate a specific natural art material.

22. The apparatus of claim 12, wherein the application is further configured to render the fill.

23. An article of manufacture comprising a program storage device readable by a computer, tangibly embodying at least one program of instructions executable by the computer to perform method steps to display a stroked fill for an object, wherein the method steps comprise:
   obtaining a computer-generated rendering comprised of vector geometry;
   obtaining a closed geometry in the computer-generated rendering;
   automatically creating a fill comprised of a series of two or more curves, wherein each curve in the series crosses an interior of the closed geometry;
   subsequent to creating the fill, adjusting a property for the series of curves; and
   automatically adjusting each curve in the series of curves based on the adjusted property without user input.

24. The computer readable media of claim 23, wherein the property is adjusted by a user via a graphical user interface.

25. The computer readable media of claim 23, wherein the property has a related variation parameter that defines a percentage of variation for the property for each curve in the series.

26. The computer readable media of claim 23, wherein the property comprises an angle property that defines an angle at which the fill is oriented.

27. The computer readable media of claim 23, wherein the property comprises an arc property that defines a bend amount of each curve in the series.

28. The computer readable media of claim 23, wherein the property comprises an overhang property that defines an amount that each curve overhangs a boundary of the closed geometry.

29. The computer readable media of claim 23, wherein the property comprises a spacing property that defines a spacing between each curve in the series.

30. The computer readable media of claim 23, wherein:

the property of the series of curves is adjusted subsequent to rendering the fill; and the rendered fill is automatically and dynamically updated to reflect the adjustment.

31. The computer readable media of claim 23, wherein each of the two or more curves comprises a Bezier curve.

32. The computer readable media of claim 23, wherein the logic further comprises applying a shading to the fill to simulate a specific natural art material

33. The computer readable media of claim 23, wherein the logic further comprises rendering the fill.

\* \* \* \* \*